(12) United States Patent
Vollrath et al.

(10) Patent No.: US 6,386,394 B1
(45) Date of Patent: May 14, 2002

(54) LIQUID DISPENSER TO DISPENSE A PREDEFINED AMOUNT OF LIQUID

(76) Inventors: Klaus M. A. Vollrath, 18 Boons Place, Faerie Glen, Pretoria (ZA), 0043; Jurgen K Vollrath, 1222 Settle Ave., San Jose, CA (US) 95125

( * ) Notice: Subject to any disclaimer, the term of this patent is extended or adjusted under 35 U.S.C. 154(b) by 0 days.

(21) Appl. No.: 09/617,670

(22) Filed: Jul. 17, 2000

(51) Int. Cl.[7] .............................................. B65D 37/00
(52) U.S. Cl. ...................................... 222/207; 222/420
(58) Field of Search ................................ 222/207, 420, 222/454, 456

(56) References Cited

U.S. PATENT DOCUMENTS

| | | | | |
|---|---|---|---|---|
| 4,437,587 A | * | 3/1984 | Duering | 222/456 |
| 4,646,948 A | * | 3/1987 | Jennings | 222/454 |
| 5,373,964 A | * | 12/1994 | Moore | 222/420 |
| 5,638,994 A | * | 6/1997 | Libit et al. | 222/207 |
| 5,918,781 A | * | 7/1999 | Stinson | 222/454 |
| 6,223,947 B1 | * | 5/2001 | Bernard | 222/420 |

* cited by examiner

*Primary Examiner*—Joseph A. Kaufman
(74) *Attorney, Agent, or Firm*—Jurgen Vollrath

(57) ABSTRACT

A liquid dispenser comprises a container for supporting liquid, and has a dispensing end with an opening. A reservoir is located in the container and is connected to the opening, and a structure is provided for channeling liquid into the reservoir. Liquid is propelled from the dispenser by squeezing resiliently depressable portions of the dispenser. The reservoir may take the form of a bowl-like structure or may retain liquid by cohesive and adhesive forces. The dispenser may also include a nozzle and a rest for resting the dispenser against a suitable surface when squeezing the dispenser.

12 Claims, 7 Drawing Sheets

LIQUID DISPENSER TO DISPENSE A PREDEFINED AMOUNT OF LIQUID

BACKGROUND OF THE INVENTION

1. Field of the Invention

The invention relates to a liquid dispenser. In particular it relates to a dispenser for dispensing predefined amounts of liquid.

2. Discussion of the Prior Art

A common problem experienced by users in administering eye drops is to correctly position the bottle relative to the eye to ensure that the medication gets into the eye. Also, some eye drops may take the form of medication where the amount of medication administered is critical. Where a defined number of drops of the eye solution is to be dispensed, the user often has limited control over the number of drops squeezed from the bottle, which may lead to over-medication or wastage of eye drop solution.

The problem is further exacerbated by the fact that the administering of the eye drops from containers known in the art, requires that the user tilt his or her head back or lie down to allow the solution to drop into the eye. This may not always be appropriate since the circumstances may not allow the person to assume the appropriate position or the user may, in fact, be elderly or have a condition that makes it difficult to tilt the head back sufficiently.

Many other situations exist in which liquid containers, such as water bottles used by runners, require the user to tilt his or her head back to dispense the liquid and where the amount of liquid dispensed is difficult to control.

The present invention seeks to address these problems.

SUMMARY OF THE INVENTION

According to the invention there is provided a liquid dispenser, comprising a container defining a liquid supporting chamber, and having a dispensing end defining a dispensing opening; a liquid retainer located in the container and being in flow communication with the dispensing opening, and means for increasing the internal pressure of the container, wherein the liquid retainer has a liquid receiving opening located above the highest level of the liquid in the container when the dispenser is in its operative orientation.

The liquid retainer can take the form of a bowl-like structure, the bottom of which is connected to the dispensing opening by a pipe or channel. Instead, the liquid retainer can take the form of a flared reservoir or other structure that retains liquid by cohesive and adhesive forces.

Typically, the dispenser includes a liquid capturing means for channeling liquid to the liquid retainer.

In order to propel liquid from the liquid retainer to the dispensing opening, the container may have resiliently compressible walls or the dispenser my include one or more resiliently depressable protrusions extending from the container.

The dispenser may also include a nozzle to define the nature and direction of the spray or stream emitted from the dispenser.

The dispenser may also include a positioning member for resting the dispenser against a cheekbone or other suitable surface.

DETAILED DESCRIPTION OF THE INVENTION

Figure 1:
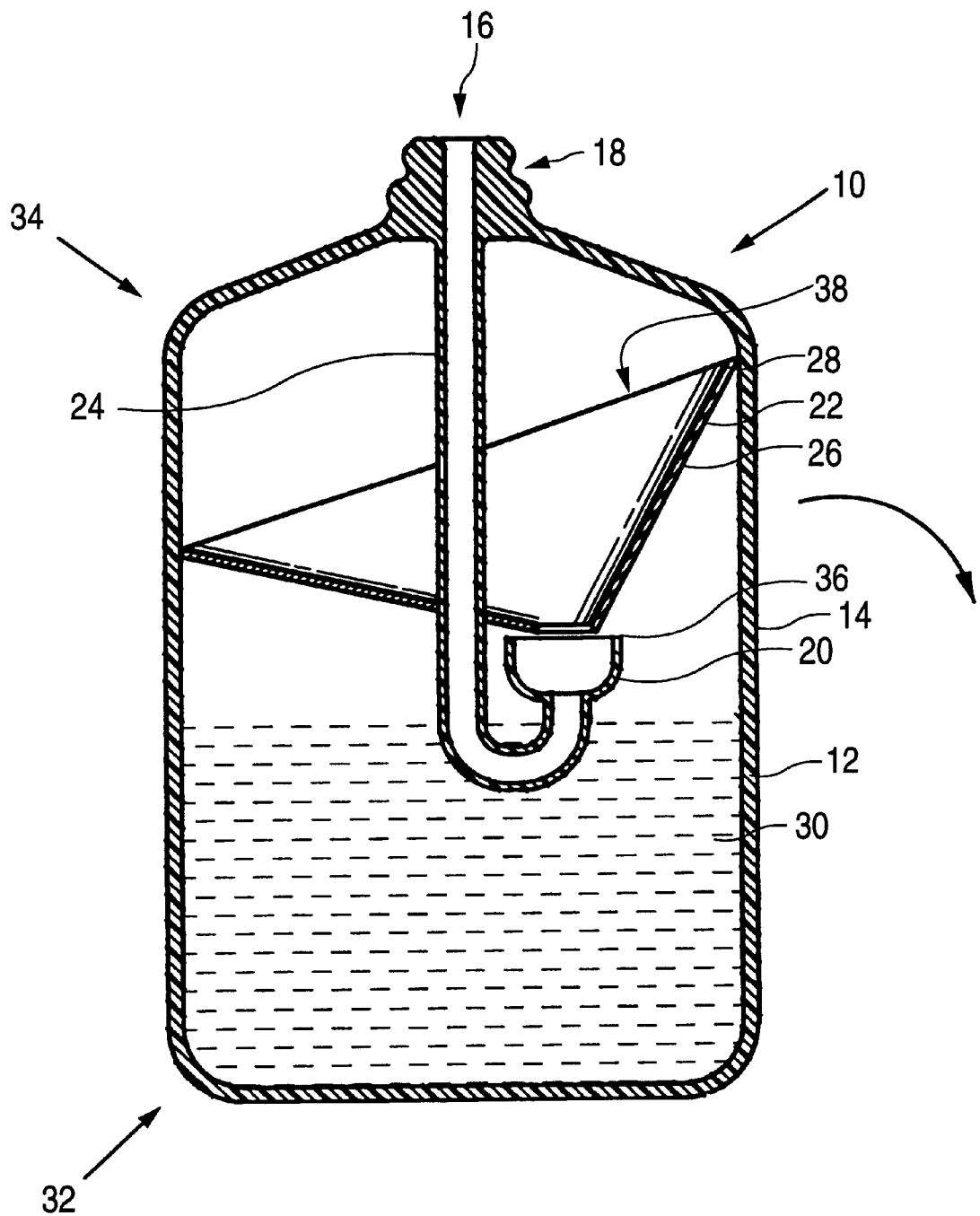
FIG. 1 is a sectional side view of one embodiment of a liquid dispenser according to the invention.

FIG. 1 shows a sectional side view of a dispenser 10 of the invention. The dispenser 10 comprises a container 12 which is made of a resiliently flexible material, such as plastic, allowing the walls 14 of the container 12 to flex inwardly when the container 12 is compressed, such as when a user squeezes the container 12 with his fingers.

The container 12 has an opening 16 defined by a threaded mouth portion 18. Within the container 12 is a liquid retainer or reservoir 20 and a cone-like structure 22 for channeling liquid into the reservoir 20. The reservoir 20 is connected to the opening 16 by means of a pipe 24. It will be appreciated that instead of a pipe 24 and cone-like structure 22, portions of the internal structure of the container 12 could be made of solid plastic or other solid material in which conical portions and liquid channels are formed to define a cone-like structure similar to the structure 22, and a channel performing the same function as the pipe 24.

Figure 2:
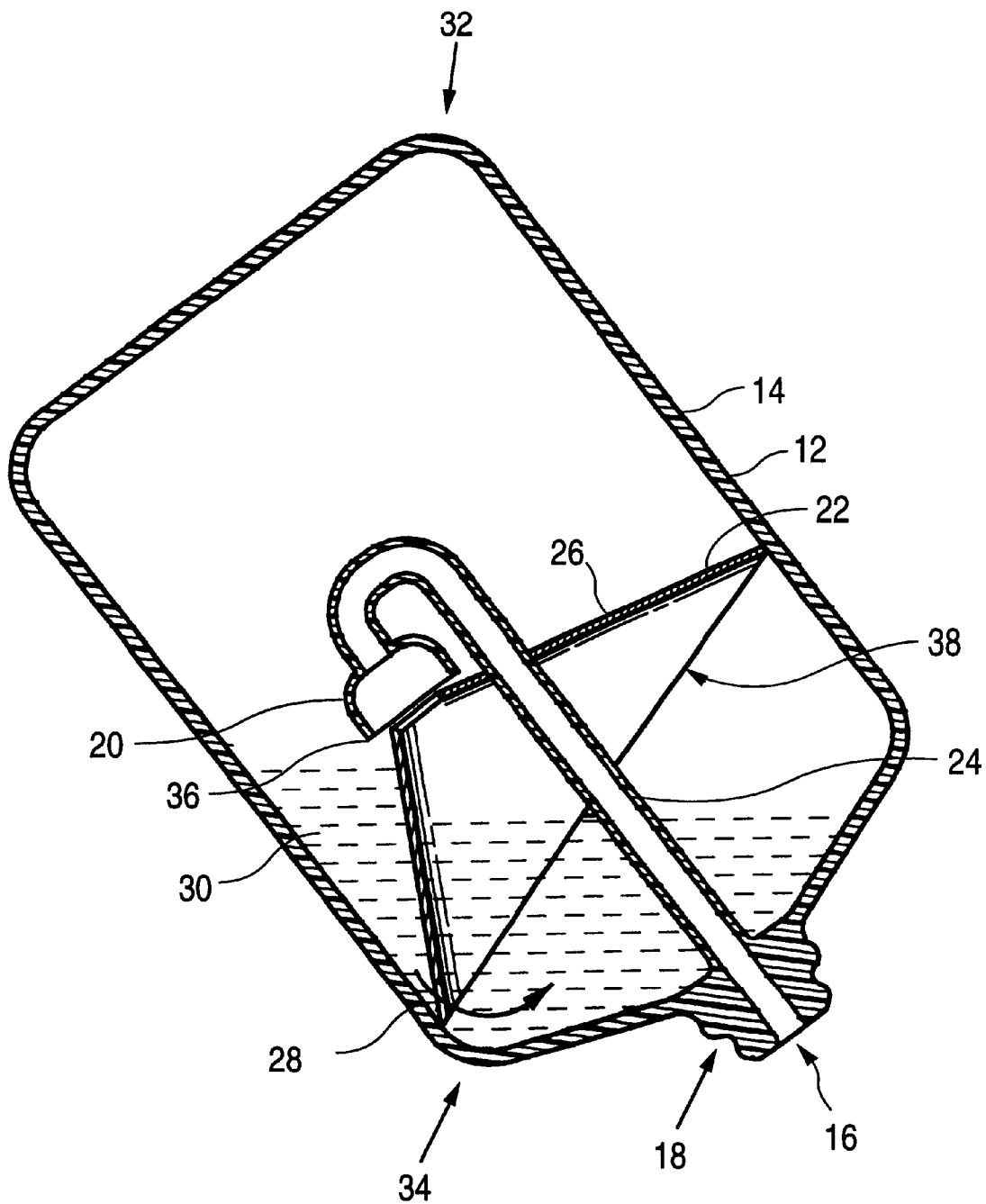
FIG. 2 is a sectional side view of the dispenser of FIG. 1, showing the dispenser being tilted as part of the steps involved in using the dispenser.
Figure 3:
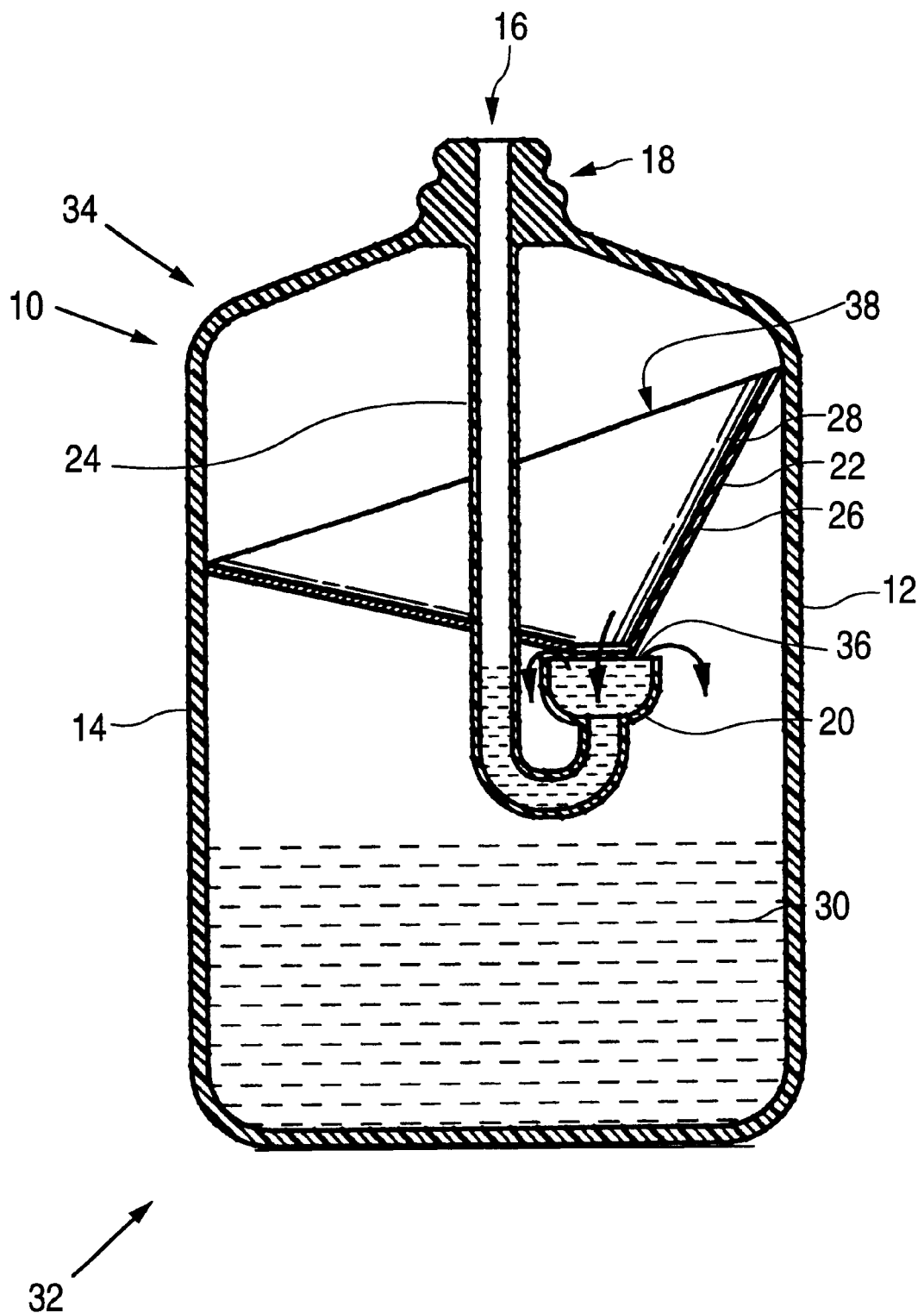
FIG. 3 is a sectional side view of the dispenser of FIGS. 1 and 2, showing the effect of tilting the dispenser and returning it to its vertical position.

The wide portion of the cone-like structure 22 abuts the inner surface of the wall 14 and is placed at an angle, as shown in FIGS. 1 to 3. The wall 26 of the structure 22 has one or more openings 28 to permit liquid 30 to pass from the base end 32 of the container 12 into the cone-like structure 22 when the dispenser 10 is tilted as illustrated in FIG. 2. The liquid 30 passes through the one or more openings 28 to the mouth end 34 of the container 12, and into the cone-like structure 22 where it is captured and passed into the reservoir 20. As the dispenser is returned to its upright position as shown in FIG. 3, the liquid captured in the structure 22 continues to pass from the structure 22 into the reservoir 20. Once the reservoir 20 is filled to the rim 36 of the reservoir 20, excess liquid spills over the rim 36 and back into the container 12.

It will be appreciated that by appropriately choosing the size of the reservoir 20 and the volume of the section of pipe 24 that will be filled when the particular liquid 30 fills the reservoir, the amount of liquid that remains in the reservoir 20 and section of pipe when the dispenser 10 is held in an upright position, can be predefined. It will be appreciated that, among other things, the cohesive and adhesive properties of the particular liquid 30 to be dispensed, will affect the amount of liquid retained in the section of the pipe 24.

In one embodiment, at least one opening 28 in the structure 22 is placed at the wide rim 38 of the cone-like structure 22, namely, on the side that is most distant from the base end 32 of the container. Placing an opening at this location allows even a small amount of liquid left in the container 12 to be channeled to the opening under gravity when the dispenser 10 is inverted.

To dispense the liquid captured in the reservoir 20 and pipe 24, the user squeezes the flexible walls 14 of the container 12, causing the resultant increased air pressure in the container 12 to propel the liquid out through the opening 16. It will be appreciated that the size and shape of the opening 16 may be formed appropriately to achieve the desired liquid stream or spray. Instead, a separate nozzle may be attached to the threaded mouth portion 18.

Figure 4:
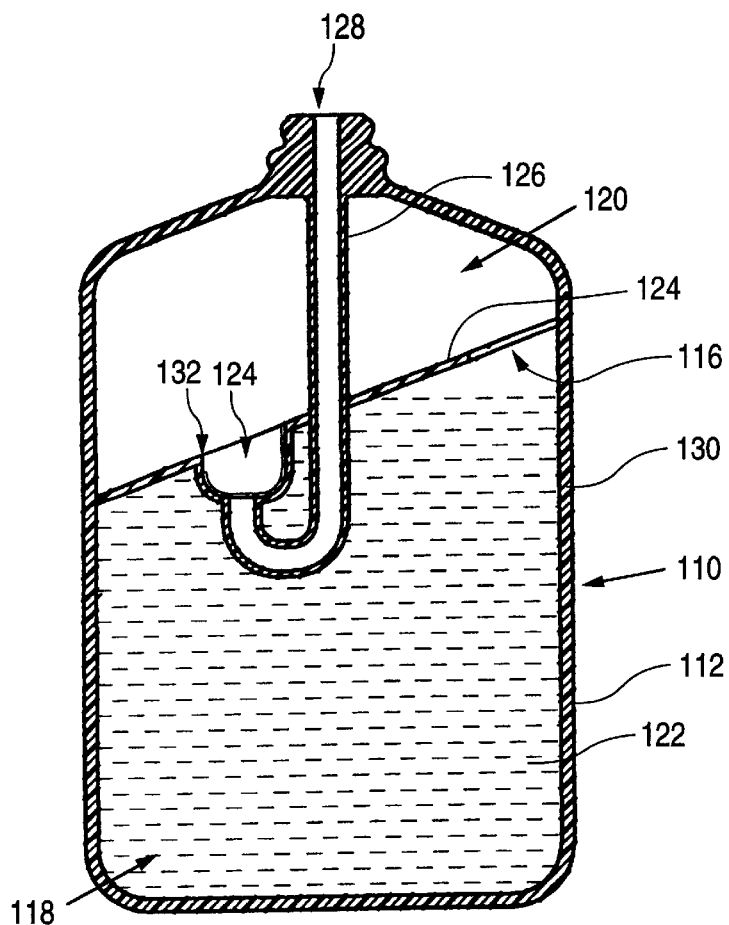
FIG. 4 is a sectional side view of another embodiment of a dispenser according to the invention.
Figure 5:
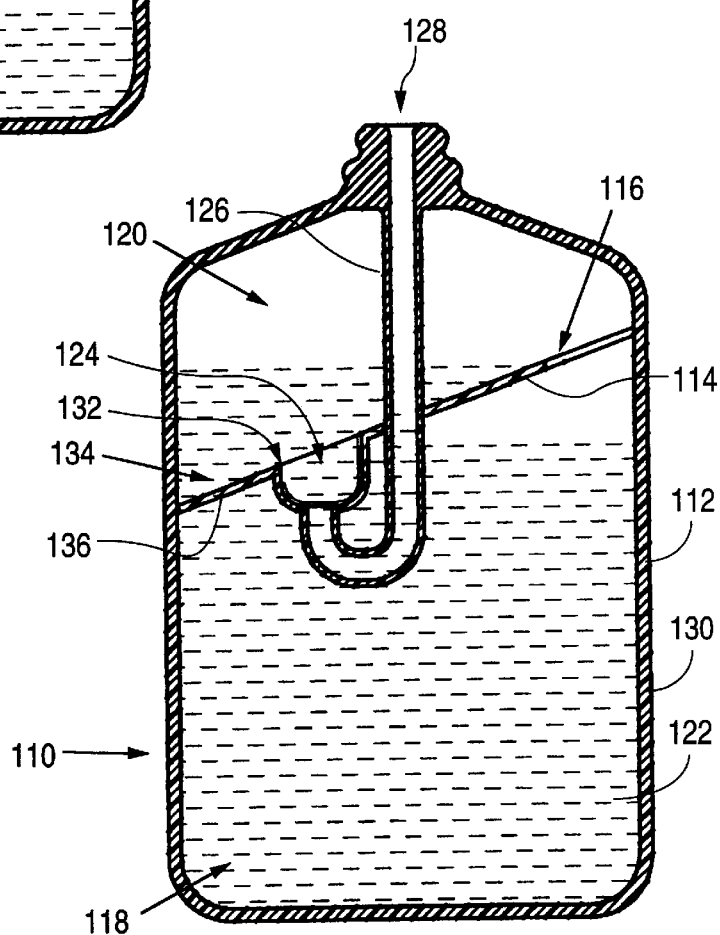
FIG. 5 is a sectional side view of the dispenser of FIG. 4, showing the effect of tilting the dispenser and returning it to its vertical position.

Another embodiment of the invention is shown in FIGS. 4 and 5. The dispenser 110 of this embodiment comprises a container 112 similar to the container 12 of the embodiment of FIGS. 1 to 3. A wall 114 having an opening 116 divides the container into a base region 118 and a mouth region 120 located at the opening end of the container 112. The opening 116 allows liquid 122 to pass from the base region 118 to the mouth region 120 of the container 112. The wall 114 then channels the liquid into a reservoir 124. It will be appreciated that liquid will fill not only the reservoir 124 but also a portion of the mouth region 120 up to the lowest point of the opening 116 in the wall 114 or any other opening in the wall 114, as defined when the dispenser is held in its dispensing position, and as illustrated, for example, in FIG. 5. The liquid 122 will also fill a portion of the pipe 126, depending on the height of the liquid in the mouth region 120, the width of the pipe 126, and the cohesive and adhesive properties of the liquid 122 in relation to the pipe 126.

Typically, liquid is transferred into the mouth region 120 by inverting the dispenser 110 and returning the dispenser 110 to its dispensing position. In order to propel the liquid in the mouth region 120, reservoir 124, and pipe 126 from the opening 128, the flexible walls 130 of the container 112 are squeezed, causing the pressure inside the dispenser 110 to increase and propel the liquid through the mouth opening 128. It will be appreciated that squeezing the walls 130 may cause some further liquid to pass from the base region 118 into the mouth region 120. It will also be appreciated that this embodiment has the disadvantage that the liquid in the mouth region that is located below the lowest point of the lip 132 of the reservoir 124 (defined by region 134 in FIG. 5), when the dispenser 110 is held in its dispensing position will not pass into the reservoir 124 and will therefore not be propelled from the dispenser 110. This problem may be rectified by angling the portion 136 of the wall 114 upward so that the wall 114 defines a funnel-like structure (not shown).

Figure 6:
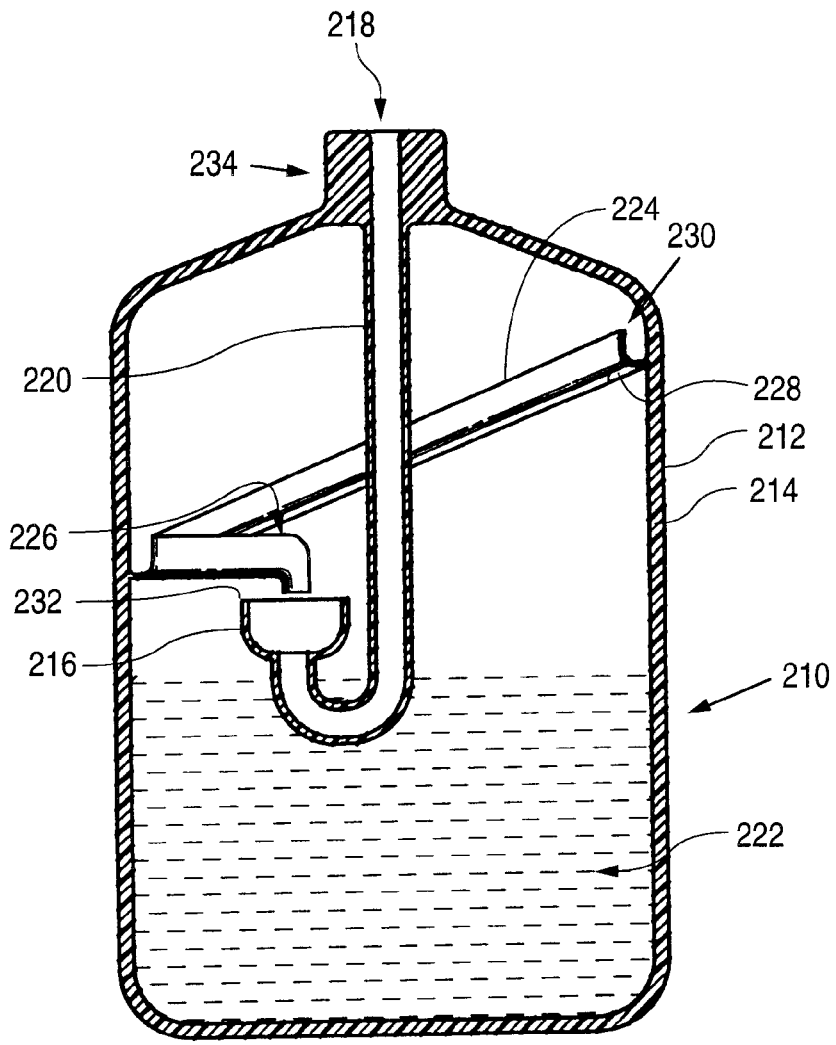
FIG. 6 is a sectional side view of yet another embodiment of a dispenser according to the invention.

Another embodiment of the invention is illustrated in FIG. 6. Like the embodiment of FIG. 1, the dispenser 210 comprises a container 212 having a flexibly resilient wall 214. It also includes a liquid reservoir 216 connected to the opening 218 of the container 212 by means of a pipe 220. Liquid 222 is channeled into the reservoir 216 by means of a tilted internal gutter 224 extending along the inner surface of the wall 214, and a channel or pipe 226. By inverting or shaking the dispenser 210, some of the liquid 222 is caught in the gutter 224 and channeled into the reservoir 216. One or more openings 228 my be provided in the gutter 224 where it contacts the inner surface of the wall 214 to permit liquid to pass more easily into the gutter 224. Preferably these openings 228 are provided in the region 230 of the gutter closest to the mouth 234 of the dispenser 210 thereby avoiding excessive loss of liquid as it flows along the gutter 224 to the reservoir 216, while still allowing even small amounts of liquid to flow into the gutter 224 under gravity when the dispenser 210 is inverted. As in the embodiment of FIG. 1, excess liquid spills over the lip 232 of the reservoir 216. The liquid in the reservoir 216 is propelled from the opening 218 at the mouth 234 of the dispenser 210 by squeezing the wall 214.

Figure 7:
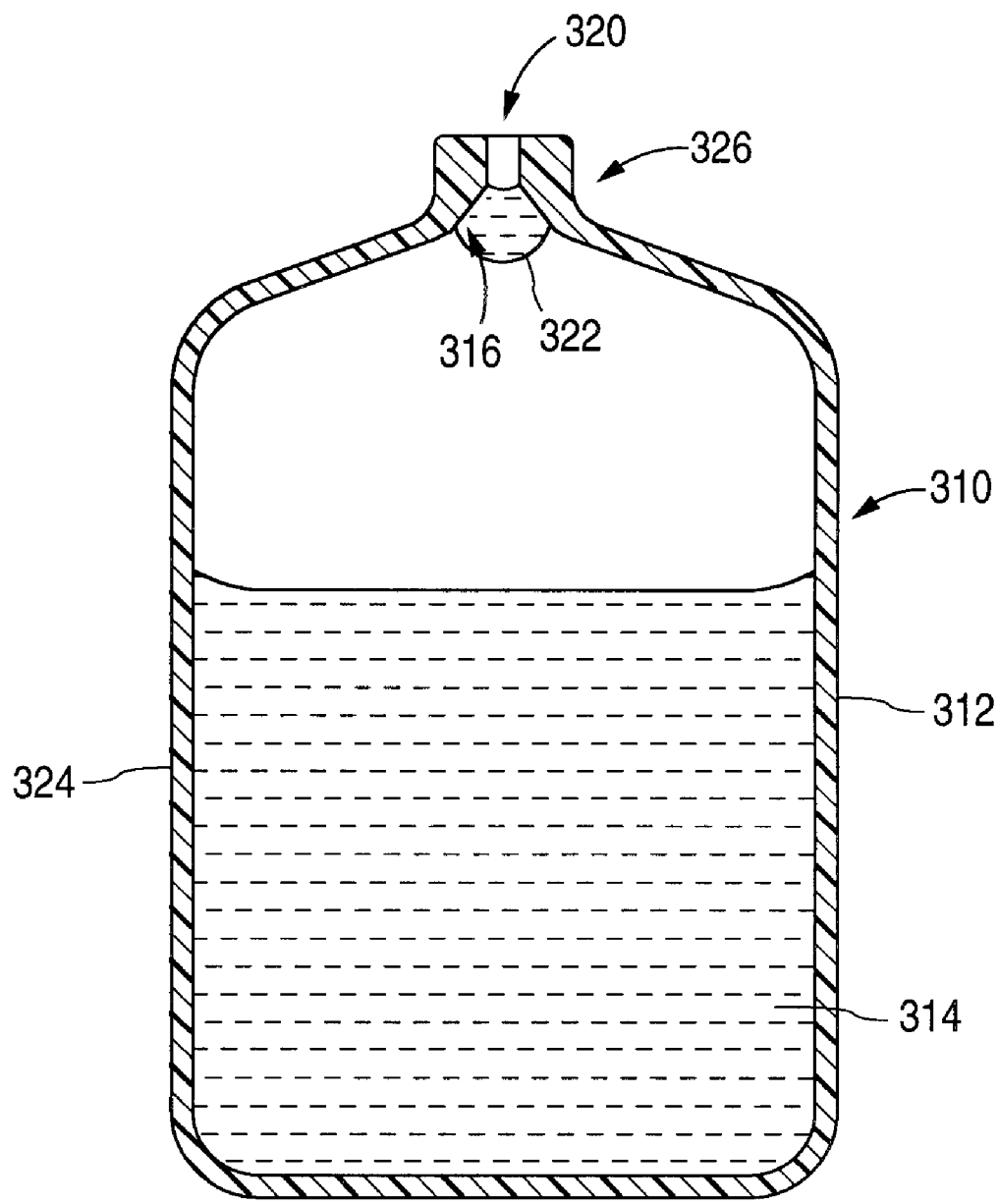
FIG. 7 is a sectional side view of yet another embodiment of a dispenser according to the invention.

Yet another embodiment of the invention is shown in FIG. 7. The dispenser 310 includes a container 312 for holding a liquid 314. The reservoir 316, in this case, comprises a flared end or flared attachment in flow communication with the opening 320. Liquid is supported by the flared reservoir 316 by means of cohesive and adhesive forces which cause a drop 320 of the liquid to be held by the flared reservoir 316. It will be appreciated that the shape and size of the flared reservoir 316 and the nature of the liquid will dictate the size of the drop 322. Thus, by adjusting the size and shape of the flared reservoir 316, appropriate amounts of the liquid 314 can be supported by the flared reservoir 316. It will also be appreciated that the reservoir need not necessarily be flared or conical in shape, but could be concave in shape, or even have parallel walls, or have any other suitable shape, provided that the liquid is retained by adhesive and cohesive forces. The liquid 314 is channeled to the flared reservoir 316 by the walls of the container 312 and the beveled inner surface of the walls of the flared reservoir 316, defined by the mouth section 326 of the dispenser 310. It will be appreciated that insofar as the beveled inner surface of the walls of the reservoir 316 retains the liquid drop 322, this part of the means for capturing the liquid and channeling it to the reservoir 316, also serves as the reservoir 316 for the liquid. The liquid drop 322 is propelled from the opening 320 of the dispenser 310 by squeezing resiliently flexible walls 324 of the container 312 in a manner described above for the other embodiments.

Figure 8:
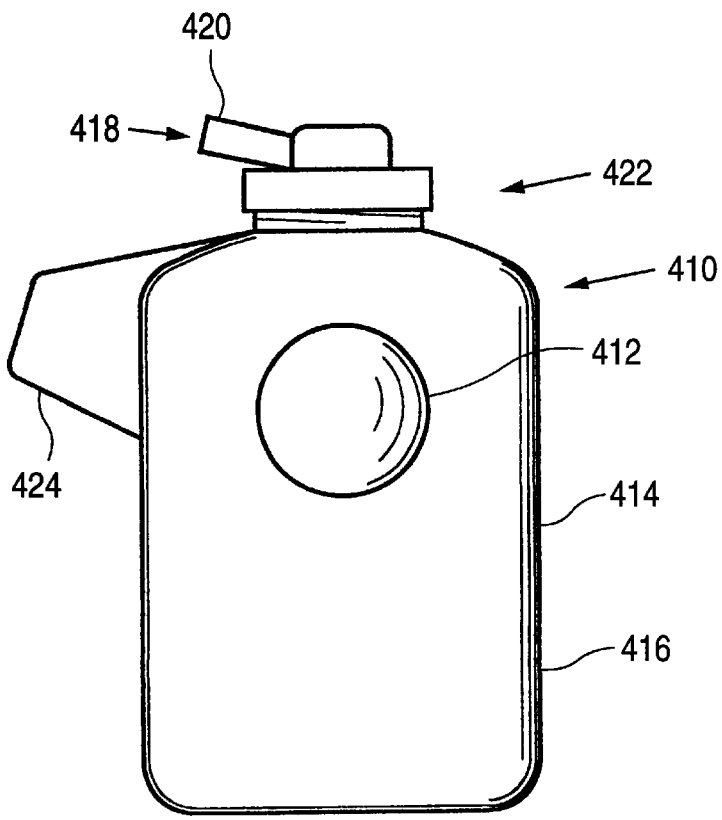
FIG. 8 is a side view of an embodiment of a dispenser according to the invention, showing external attributes.
Figure 9:
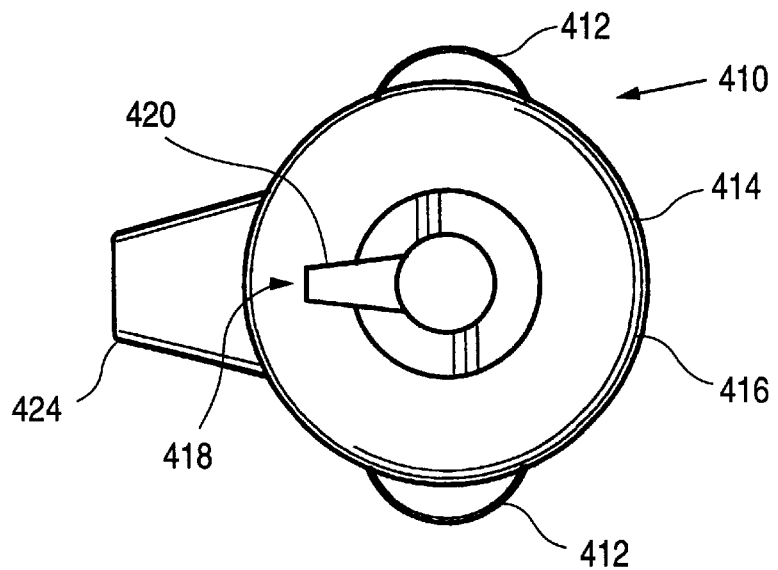
FIG. 9 is a plan view of the dispenser of FIG. 7.

FIGS. 8 and 9 show an embodiment of the invention in which the dispenser 410 includes resiliently flexible convex protrusions 412 extending from the wall 414 of the dispenser 410. These protrusions 412 are provided instead of or in addition to the use of a resiliently flexible wall 414. It will be appreciated that the features of FIGS. 8 and 9 may be used with any dispenser of the invention. By squeezing the protrusions 412, the internal pressure of the dispenser 410 is increased to propel the liquid from the opening 418. The protrusions 412 may be formed integrally with the wall 414, or the wall 414 may be provided with cut-outs for receiving the protrusions 412. FIGS. 8 and 9 also show a nozzle 420 extending from the mouth 422 of the dispenser 410, to emit the liquid in the form of a stream or spray, and to suitably position the opening 418. The embodiment also includes a rest 424 which, in this embodiment, extends from the wall 414, and serves to help the user steady the dispenser 410. For example, in the case of an eye-drop dispenser, the rest 424 helps the user to steady the dispenser against his cheekbone or adjacent his eye and allows him to draw down the lower eye-lid or draw up the upper eye-lid with the rest 424, thereby opening the eye wider to, more easily, direct the liquid stream or spray into the eye. In a preferred embodiment, the nozzle 420 and rest 424 are arranged to direct the stream or spray at a particular part of the user's eye, e.g. the cornea or conjunctiva.

Figure 10:
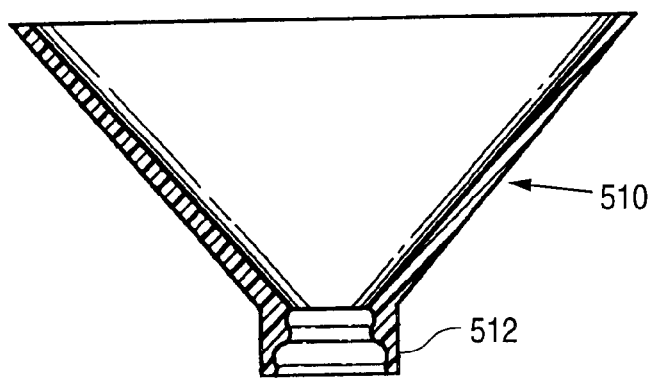
FIG. 10 is a sectional side view of a prior art eye drop bottle adaptor.

FIG. 10 shows a frusto-conical structure 510 known in the art, which screws onto eye-drop dispensing bottles to help locate the dispensing bottle relative to the user's eye. The structure 510 could conveniently be used with dispensers of the invention by providing the dispenser of the invention with a threaded mouth section, as shown, for example, in the embodiments of FIGS. 1–3, and 4–5, to receive a complementarily threaded collar 512 of the structure 510.

What is claimed is:

1. A dispenser comprising,
    a container defining a liquid supporting chamber, and having a dispensing end defining a dispensing opening,
    a liquid retainer located in the container,
    means for increasing the internal pressure of the container,
    the liquid retainer has a liquid receiving opening located above the highest level of the liquid in the container when the dispenser is in its operative orientation,
    the liquid retainer supports a predefined amount of the liquid against the force of gravity by only adhesive and cohesive forces when the dispenser is in its operative orientation, and
    a channel extending from the liquid retainer to the dispensing opening for channeling the predefined amount of liquid in the liquid retainer to the dispensing opening when the internal pressure of the container is increased.

2. A dispenser of claim 1, further comprising a liquid capturing means for channeling liquid to the liquid retainer.

3. A dispenser of claim 2, wherein the capturing means is physically connected to the liquid retainer and defines the liquid receiving opening of the retainer.

4. A dispenser of claim 1, further comprising a positioning member for resting the dispenser against a surface.

5. A dispenser of claim 4, wherein the dispenser is an eye solution dispenser, and the positioning member extends from the container and is shaped to rest against a user's cheekbone.

6. A dispenser of claim 1, wherein the dispensing end comprises a nozzle extending from the longitudinal axis of the dispenser, at an angle.

7. A dispenser of claim 1, wherein at least a part of the container is resiliently compressible.

8. A dispenser of claim 1, wherein the dispenser includes at least one resiliently depressable protrusion extending from the container.

9. A dispenser of claim 1, wherein the liquid retainer comprises a flared reservoir.

10. A dispenser of claim 9, wherein at least one of the container, and a mouth section of the dispenser, define a liquid capturing means for channeling liquid to the liquid retainer.

11. A dispenser of claim 10, further comprising a positioning member for resting the dispenser against a surface.

12. A dispenser of claim 11, wherein the dispenser is an eye solution dispenser, and the positioning member extends from the container and is shaped to rest against a user's cheekbone.

* * * * *